Sept. 29, 1959     J. J. SUMMERS     2,906,549
LOOSE COUPLING FOR TUBULAR MEMBERS
Filed Aug. 30, 1957

INVENTOR.
James J. Summers
BY Brown, Critchlow, Flick
 & Peckham
His Attorneys

United States Patent Office 2,906,549
Patented Sept. 29, 1959

2,906,549

LOOSE COUPLING FOR TUBULAR MEMBERS

James J. Summers, Bethel, Pa., assignor to Mine Safety Appliances Company, Pittsburgh, Pa., a corporation of Pennsylvania Application August 30, 1957, Serial No. 681,261

5 Claims. (Cl. 285—140)

This invention relates to couplings, and more particularly to a coupling for loosely connecting one tubular member to another by simply moving them axially toward each other.

It is among the objects of this invention to provide a coupling which is simple and inexpensive in construction, which can be used for connecting a tubular member of one diameter to another tubular member of another diameter, which is applied to one tubular member by moving it axially, which is automatically locked in coupling position, and which can be applied and removed very quickly without the use of tools.

In accordance with this invention, an annular coupling member carries at one side a plurality of retaining elements that project a short distance radially inward from its inner wall. At least one of these elements is spring-pressed against the adjoining side of the annular member, but can be moved away from it and outward toward the outer wall of the member when a flange on a tube or the like, which is inserted from the opposite side of the coupling, is pressed against it. This permits the flange to pass the inner ends of the retaining elements in order to hold the coupling on the tube. Another tubular element is secured to the outer wall of the annular member in any suitable manner. The coupling can be removed from the flanged tube by merely pushing the movable retaining element or elements away from the annular member so that the tube can be withdrawn.

Figure 1:
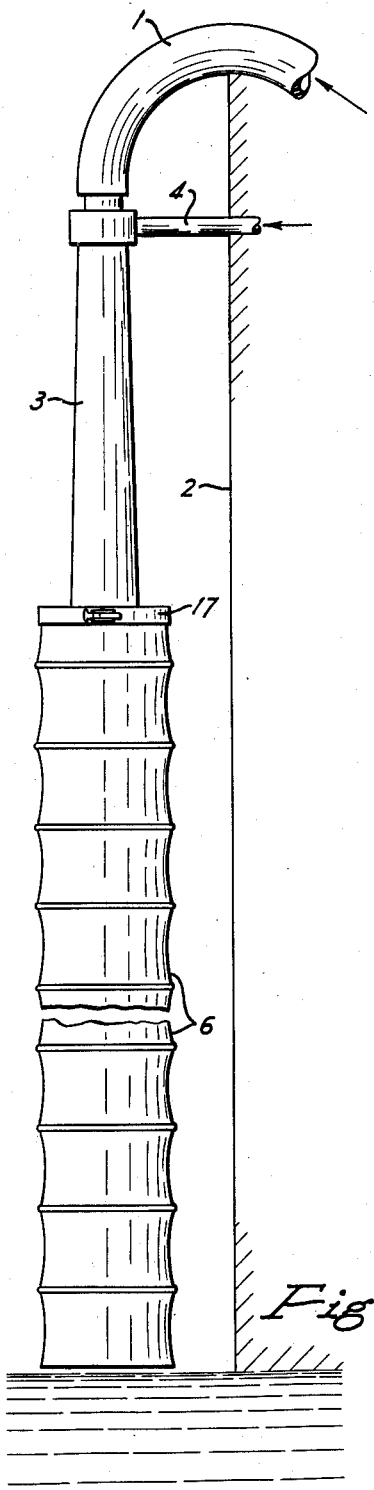
Figure 2:
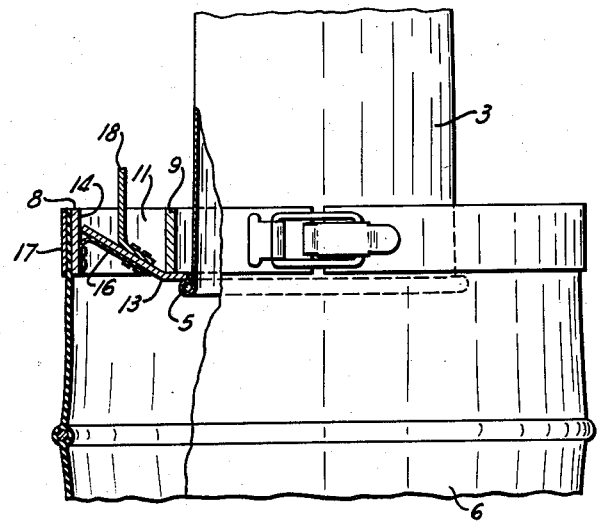
Figure 3:
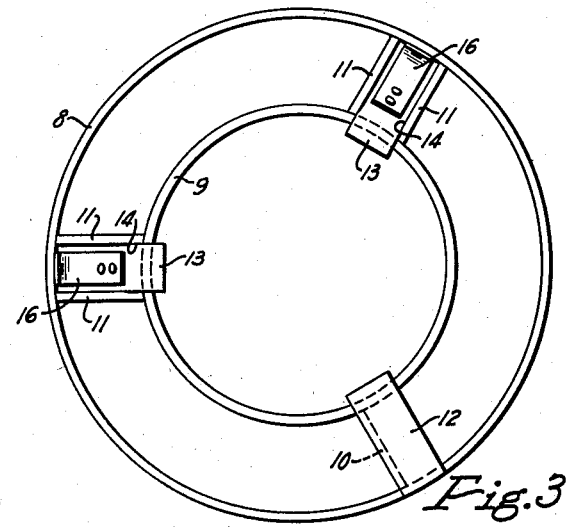

The preferred embodiment of the invention is illustrated in the accompanying drawings, in which Fig. 1 is a side view of apparatus showing one use for my coupling;

Fig. 2 is an enlarged fragmentary side view of the apparatus, showing part of the coupling in radial section; and Fig. 3 is a view of the bottom side of the coupling.

Referring to Fig. 1 of the drawings, apparatus is shown for vacuum cleaning the holds of ships, which is one of the many uses for my coupling. The apparatus includes a flexible hose 1 that extends down into the ship 2 and has an inlet nozzle (not shown) at its lower end. The upper end of the hose extends out over the rail of the ship and is connected to the upper end of a downwardly directed ejector 3. Fluid pressure for operating the ejector is supplied through a pipe 4 connected to the side of the ejector. The lower outlet end of the ejector is encircled by a flange 5 (Fig. 2), such as an integral bead, from which a relatively large flexible sleeve 6 is hung. The sleeve extends down close to the water, so that the material drawn out of the ship by the ejector will be confined until it is deposited as waste in the water. The coupling, by which the upper end of the sleeve is connected to the ejector, forms the subject matter of this invention.

As shown in Figs. 2 and 3, the body of the coupling is an annular member which, when it is not necessary that it be solid preferably is formed from two radially spaced concentric metal rings 8 and 9 that are cylindrical to give the annular member appreciable depth. These rings are rigidly connected together by means of spacing plates 10 and 11 between the rings and welded to them. As shown in Fig. 3, the plates extend nearly radially of the rings, but at least two of them are arranged close together in parallel relation. Disposed around the rings are at least two retaining elements, but preferably there are three of them spaced about 120° apart. At least one of them is movable. When three are used, it is preferred to make one stationary and the other two movable. These retaining elements are stiff bars that extend across one side of the inner ring and project a short distance radially into it. The stationary bar 12 extends across both rings and may be integral with spacing plate 10. The other two bars 13 likewise are disposed radially of the annular member, but they do not extend across the outer ring. Instead, each of them extends into the slot 14 formed between a pair of the parallel spacing plates 11. The opposite edges of each movable bar preferably slidably engage the adjoining plates, which thereby help to guide the bars in their movements.

To hold each movable bar 13 in a slot 14 and yet permit the bar to be moved, it is attached to the annular member by means of a leaf spring 16. It is preferred to rivet the inner end of the spring to the outer side of the bar, which is the side that does not engage the inner ring 9. The outer end of the spring is riveted to the outer ring at the outer end of the slot. The springs normally hold the movable bars 13 against the inner ring. It will be seen in Fig. 2 that each movable bar is inclined from its inner projecting end toward the opposite side of the annular member, and that its outer end normally engages, or nearly engages, the outer wall of slot 14. Consequently, when pressure is applied against the projecting inner end of the bar to press it against the adjoining inner ring, the bar will not pivot on that ring because its outer end will be pressed outward against the outer ring.

This coupling is designed for connecting tubular members of different diameters. It is first inserted in the end of the larger tubular member, such as the sleeve 6, where it can be held temporarily or permanently by a suitable clamping band 17 encircling the sleeve and clamping it against the outer surface of the outer ring 8. The coupling is positioned in the sleeve with the retaining bars at the bottom of the rings. When it is desired to connect the sleeve to another member, such as the ejector 3, all that is necessary to do is to slip the inner ring 9 of the coupling over the flanged end of the ejector. The distance between the inner end of stationary bar 12 and a point on the inner ring directly across from it is substantially the same as the diameter of the ejector flange 5, although it can be slightly less because the coupling or the ejector can be tilted enough to permit the flange to pass the stationary bar. In either case, the coupling is moved straight ahead so that the inner ends of the two movable bars 13 will engage the ejector flange and be pushed away from the inner ring and swung out toward the outer ring far enough to permit them to pass over the flange. The springs then snap the bars back against the inner ring behind the flange and the ejector tube then cannot be withdrawn from the coupling. The three bars resting on top of the flange support the sleeve from the ejector so that it cannot possibly become detached from the ejector and drop into the water. The sleeve will be hung coaxially from the ejector. The open space between the two rings is an asset when the coupling is used as shown, because it provides an air inlet that reduces back pressure against the ejector.

In order to remove the coupling from the ejector, the coupling is raised a short distance on the ejector tube and then the two movable bars 13 are pushed down and out to permit them to clear the flange as the tube and coupling are separated. This manipulation of the bars can be done by pressing the thumbs down against them, but preferably they are provided with rigid depressor members 18 that project from the side of the coupling opposite to springs 16; i.e., upward as shown in Fig. 2. By simply pushing downward on these depressors or by tilting them toward the center of the coupling, the movable bars will be tilted down away from the ejector flange.

It will be seen that with this coupling a flanged tubular member can be quickly attached to another tubular member connected to the coupling by simply pushing the flanged member through the coupling or by slipping the coupling over the flange. The retaining bars automatically lock the coupling in place. No tools and no twisting of the coupling are required. Removal is also quick and easy, because all that has to be done is to press on the depressors and then slip the coupling axially off the flanged tube.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A coupling comprising an annulus having axially spaced sides and rigidly connected inner and outer concentric walls, said annulus being provided between said walls with a plurality of radial slots in it having closed radially spaced ends, a stiff retaining element movably mounted in each slot with its outer end engageable with the outer end of the slot, said retaining element having a portion in the slot inclined to the axis of said member and having an inner end projecting from the slot a short distance radially inward across and beyond said inner wall at one side of the annular member, and resilient means engaging the annulus and the retaining elements and urging the latter against said one side of said annulus adjacent said inner wall, the inner ends of said elements being movable away from said side and outward toward the outer wall of said annulus when a flange on a tube inserted from the opposite side of the coupling is pressed against them, whereby to permit the flange to pass the inner ends of said retaining elements which are then returned by said resilient means toward said inner wall to hold the coupling on the tube.

2. A coupling according to claim 1, in which said resilient means are leaf springs disposed in said slots and fastened to the retaining elements therein and to said annulus at the outer ends of the slots, the resilient means holding said elements in the slots.

3. A coupling member comprising a pair of radially spaced concentric rings, means rigidly connecting the rings together, a plurality of movable bars disposed between the rings and having outer ends engageable with the inner surface of the outer ring, each bar being inclined to the axis of the rings from its outer end to one edge of the inner ring, the inner ends of the bars projecting a short distance radially inward from said edge of the inner ring, and springs fastened to the bars and one of the rings to urge the inner end portions of the bars toward said edge of the inner ring but permitting said portions to be swung away from the inner ring outward toward the outer ring when a flange on a tube inserted from the opposite side of the coupling member is pressed against them, whereby to permit the flange to pass the inner ends of the bars.

4. A coupling according to claim 1, in which said resilient means are disposed in said slots and fastened to the retaining elements therein and to the annulus at one end of the slots, the resilient means holding said elements in the slots.

5. A coupling according to claim 3, in which said springs are leaf springs disposed inside of said slots and forming the only connection between said bars and rings.

References Cited in the file of this patent

UNITED STATES PATENTS

| 221,162 | Edelen | Nov. 4, 1879 |
| 1,442,404 | Haubert | Jan. 16, 1923 |
| 1,865,121 | Lotton | June 28, 1932 |

FOREIGN PATENTS

| 595,443 | Germany | Apr. 10, 1934 |
| 938,815 | Germany | Feb. 9, 1956 |